United States Patent [19]

Meili

[11] 4,210,679
[45] Jul. 1, 1980

[54] PROCESS FOR THE MANUFACTURE OF A MERINGUE OF IMPROVED STIFFNESS

[75] Inventor: Rene Meili, Neuhausen am Rheinfall, Switzerland

[73] Assignee: Firma Schoxi AG, Neuhausen am Rheinfall, Switzerland

[21] Appl. No.: 952,987

[22] Filed: Oct. 20, 1978

[30] Foreign Application Priority Data

Oct. 28, 1977 [DE] Fed. Rep. of Germany ....... 2748474

[51] Int. Cl.² ............................................. A23J 3/02
[52] U.S. Cl. ..................................... 426/564; 426/658
[58] Field of Search ................ 426/564, 568, 572, 571

[56] References Cited

U.S. PATENT DOCUMENTS

| 2,524,333 | 10/1950 | Snelling | 426/568 |
| 2,588,308 | 3/1952 | Tressler | 426/564 |
| 2,692,201 | 10/1954 | Conrad | 426/571 |
| 3,338,721 | 8/1967 | Schoonover | 426/568 |
| 3,490,920 | 1/1970 | Grettie | 426/571 |
| 4,018,901 | 4/1977 | Hayward et al. | 426/571 |

Primary Examiner—Jeanette M. Hunter
Attorney, Agent, or Firm—Burns, Doane, Swecker & Mathis

[57] ABSTRACT

An improved process is disclosed for the manufacture of a meringue for use in meringue-garnished pastries which will retain its stiffness after whipping. The meringue is formed by whipping a mixture of warm water, boiled gelatine and whipping agents to provide a whipped mixture, adding a boiling solution of xylitol under continued whipping, and thereafter admixing pulverized xylitol under further whipping until a non-collapsing stiffness is attained.

1 Claim, No Drawings

PROCESS FOR THE MANUFACTURE OF A MERINGUE OF IMPROVED STIFFNESS

BACKGROUND OF THE INVENTION

The invention concerns a process for the manufacture of a meringue for use in meringue-garnished pastries which will retain its stiffness after whipping which comprises the use of water, gelatine, whipping agents and sugar substitutes to form the meringue.

The beet and cane sugars of confectionaries of all types are bing replaced either completely or in part for reasons of health by other sweetening substances which contain less calories and which are less dangerous to the human body. In addition to sugar substitutes such as fructose which have been in use for some time, xylitol (i.e., $C_5H_7(OH)_5$) is now also being used as a sugar substitute. For example, xylitol has been used in the manufacture of chewing gum, candies and pastries. However, xylitol has the disadvantage that it has a low compatibility with respect to foaming. In other words, it will alter the surface tension of a meringue whip in such manner that it will cause the meringue to collapse within a short period of time. For this reason it was not feasible heretofore to utilize xylitol in the manufacture of meringue-garnished pastries.

It is therefore the aim of the invention to provide a process that will make it possible to produce a meringue which will retain its stiffness after whipping for meringue-garnished pastries even when using xylitol.

SUMMARY OF THE INVENTION

This invention solves the problem of premature collapse of the meringue by first forming a mixture of warm water, soaked gelatine and whipping agents of a milk base. The mixture is whipped to form a stiff meringue. There is then added to this mixture a solution of boiled xylitol and water in a thin squirt under continued whipping. Pulverized xylitol is finally admixed to the meringue and the whipping of the mass is continued until non-collapsing stiffness is attained. Generally, the ingredients are used in the following percentages by weight: 25 to 35% of water, 4 to 8% of gelatine, 0.3 to 0.8% of whipping agents of a milk base, 20 to 30% of dissolved xylitol and 30 to 45% of pulverized xylitol, based on the total admixture. Typical whipping agents which may be used include such agents which produce a structure of airfilled microcells in the substance to be foamed, f.i. the milkbased whipping agent "Hyfoma", a product of Lenderink & Co. N.N., Schiedham/Netherlands.

It is further advantageous to initially whip the meringue at the maximum speed of the whipping machine employed, reducing the whipping speed slightly as the boiling aqueous solution of xylitol is added. The whipping speed is increased to the initial speed as the pulverized xylitol is added.

This process makes it possible to produce, with the use of xylitol, a meringue which will retain its stiffness after whipping in the same manner as the meringues manufactured in a standard manner, and which can be applied in a customary manner by means of a squeezing pouch, squeezing machine or automatic dressing devices.

DESCRIPTION OF THE PREFERRED EMBODIMENT

The invention will now be explained by means of a practical example. 50 grams of gelatine are soaked in water in the usual manner. 100 grams of warm water are then mixed with the 50 grams of soaked gelatine and 4 grams of a whipping agent of a milk base. This mixture is then whipped in a commercially available whipping machine at maximum speed until a stiff foam has been produced. 200 grams of xylitol admixed with 150 grams of water are brought to boiling and this boiling aqueous xylitol solution is then added in a thin squirt to the foamy mass while the whipping machine continues to run, but at a lower speed (e.g., the secondhighest speed). 300 grams of pulverized xylitol are then added in one batch, and the whipping of the meringue is continued at top speed until a non-collapsing stiffness is obtained.

The meringue is finally applied in the usual manner by means of a squeezing pouch, squeezing machine or by automatic dressing devices. Naturally, it is also possible to add aromatic substances as is usual, most advantageously at the end of the manufacturing process.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

Instead of using a whipping agent of a milk base it is possible to use proteins as the whipping agent, especially fresh albumen.

What is claimed is:

1. A process for the manufacture of a xylitol-containing meringue which will retain its stiffness for a prolonged period of time after whipping, said process comprising:
   forming a mixture of warm water, boiled gelatine, and milk-based whipping agents;
   whipping said mixture to form a stiff meringue; adding to the whipped mixture a boiling aqueous solution of xylitol under continued whipping; and
   adding pulverized xylitol to the meringue while continuing the whipping of the mixture until a non-collapsing stiffness is attained;
   said process employing 25–35 percent by weight of water, 4–8 percent by weight of gelatine, 0.3–0.8 percent by weight of milk-based whipping agents, 20–30 percent by weight of xylitol in aqueous solution, and 30–40 percent by weight of pulverized xylitol, based on the weight of the total mixture.

* * * * *